United States Patent
Grundei

[19]

[11] Patent Number: 5,937,976
[45] Date of Patent: Aug. 17, 1999

[54] VIBRATION DAMPER WITH RESTRICTOR PLATE

[75] Inventor: Manfred Grundei, Niederwerrn, Germany

[73] Assignee: Mannesmann Sachs AG, Schweinfurt, Germany

[21] Appl. No.: 08/844,458

[22] Filed: Apr. 18, 1997

[30] Foreign Application Priority Data

Apr. 19, 1996 [DE] Germany .................. 196 15 583

[51] Int. Cl.$^6$ .................................................. F16F 9/34
[52] U.S. Cl. .......................... 188/322.15; 188/322.22; 188/282.6; 188/317
[58] Field of Search ................ 188/282.6, 322.22, 188/322.15, 317, 322.13, 282.5, 280, 314, 315, 281, 282.1, 282.8, 282.9, 266.6; 267/124; 131/854, 529, 493, 493.8, 513.3, 512.15, 513.7, 513.5

[56] References Cited

U.S. PATENT DOCUMENTS

| | | | |
|---|---|---|---|
| 3,845,782 | 11/1974 | Nicholls et al. | 188/317 |
| 4,484,669 | 11/1984 | Kato | 188/282.6 |
| 4,624,347 | 11/1986 | Mourray | 188/322.15 |
| 5,529,154 | 6/1996 | Tanaka | 188/280 |
| 5,615,756 | 4/1997 | Grundei et al. | 188/322.15 |

FOREIGN PATENT DOCUMENTS

| | | |
|---|---|---|
| 0160275 | 11/1985 | European Pat. Off. . |
| 0970515 | 9/1958 | Germany . |
| 2059682 | 6/1972 | Germany . |
| 2103153 | 8/1972 | Germany . |
| 2424040 | 11/1975 | Germany . |
| 3445684 | 6/1986 | Germany . |
| 3906128 | 8/1990 | Germany . |
| 4302624 | 5/1994 | Germany . |
| 4410996 | 6/1995 | Germany . |

*Primary Examiner*—Douglas C. Butler
*Attorney, Agent, or Firm*—Nils H. Ljungman & Associates

[57] ABSTRACT

A vibration damper, whose cylinder tube is divided into two work chambers by a piston, is attached to a piston rod. A damping valve includes a damping valve body. Embossed areas have been formed into the main body of the damping valve body. The damping valve embossed areas serve as valve support surfaces with fluid passages, which fluid passages are covered by valve disks on the valve support surfaces. The damping valve body is disk-shaped, whereby the damping valve is equipped with at least one restrictor plate, which restrictor plate partially covers the inlet side of the fluid passages for at least one direction of flow, whereby the restrictor plate has recesses for the embossed areas of the damping valve body.

20 Claims, 4 Drawing Sheets

VIBRATION DAMPER WITH RESTRICTOR PLATE

BACKGROUND OF THE INVENTION

1. Field of the Invention

The invention relates to a vibration damper whose cylinder tube is divided into two work chambers by a piston attached to a piston rod, whereby a damping valve includes a damping valve body, into the main body of which damping valve embossed areas have been formed which serve as valve support surfaces with fluid passages, which fluid passages are covered by valve disks on the valve support surfaces, and whereby the damping valve body is disk-shaped.

2. Background Information

German Laid Open Patent Application No. 20 59 682 discloses a vibration damper whose cylinder tube is divided into two work chambers by a piston attached to a piston rod, whereby the piston includes a piston body with fluid passages covered by valve disks on support bodies with valve support surfaces, and the piston body is in sliding contact with the cylinder tube via at least one piston ring.

Publications European Patent No. 160 275 A1 and German Patent No. 43 02 624 C1 disclose that a multipartite piston body can be manufactured from stamped sheet instead of a sintered material. Due to the relatively complex stampings, manufacturing tolerances have a negative influence on the permissible damping force distribution. That is, to achieve a permissible damping force distribution, the parts of a piston body must be manufactured within certain tolerances. The complexity of the parts make achieving the required tolerances difficult to achieve by the stamping process.

German Patent No. 44 10 996 CI describes a vibration damper whose cylinder tube is divided into two work chambers by a piston attached to a piston rod, whereby the piston includes a piston body with fluid passages covered by valve disks on support bodies with valve support surfaces, and the piston body is in sliding contact with the cylinder tube via at least one piston ring. The piston body is disk-shaped, with embossed areas on the piston body forming the valve support surfaces. Damping valves of various designs are described, with none of the variants having a progressive damping force characteristic. A significant advantage of the piston is its extremely low structural height.

A vibration damper as disclosed in German Patent No. 24 24 040 A1 teaches that constriction of the cross-section for a progressive end section of the damping force characteristic is associated with a cross section reduction, which is problematic with respect to application to a flat piston given the available space.

OBJECT OF THE INVENTION

The object of the current invention is to realize a damping valve for a vibration damper allowing progressive damping force adjustment in at least one direction of flow, while retaining the low structural height of the damping valve body.

SUMMARY OF THE INVENTION

To achieve this object, the current invention teaches that the damping valve is equipped with a restrictor plate which partially covers the inlet of the fluid passages for at least one direction of flow, whereby the restrictor plate has recesses for the embossed areas on the damping valve body. The recesses represent an elegant solution to the space problem, since the damping valve with progressive damping adjustment is no higher than a damping valve equipped with other valve disks. This design requires no modifications to the damping valve body, facilitating the goal of the greatest possible level of standardization.

In a refinement of the current invention, the restrictor plate is fastened directly to the main body of the damping valve.

Furthermore, there are several fluid passages with various geometrical radii for each direction of flow. If used on both sides of the damping valve, the restrictor plates are identical with respect to the recesses. A single restrictor plate allows adjustment of the progressive damping force characteristic for a single direction.

To ensure proper installation of the restrictor plates, the shape of the recesses match that of the embossed areas on the damping valve body so that the embossed areas on the damping valve body center the restrictor plates. During assembly, the restrictor plates can be shifted radially and circumferentially only within very narrow tolerances. The amount of shift has no influence on the desired damping force setting. In the interest of further simplification, the outer contours of the embossed areas on the damping valve body are identical. This permits tighter tolerances for the recess in the restrictor plate, keeping the amount of shift extremely small.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is described in greater detail below with reference to the attached drawings.

DESCRIPTION OF THE PREFERRED EMBODIMENT

Figure 1:
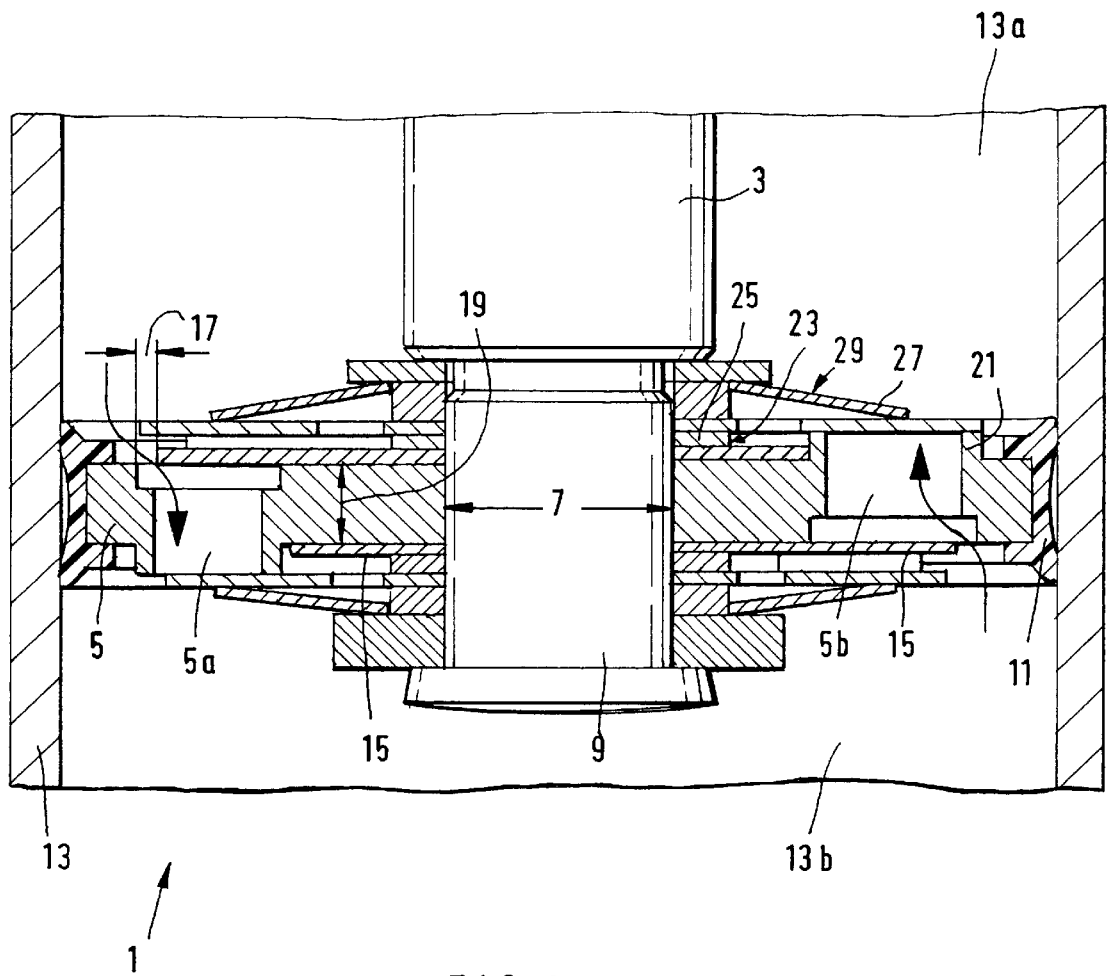
FIGS. 1B and 1 show the damping valve in section.
Figure 1A:
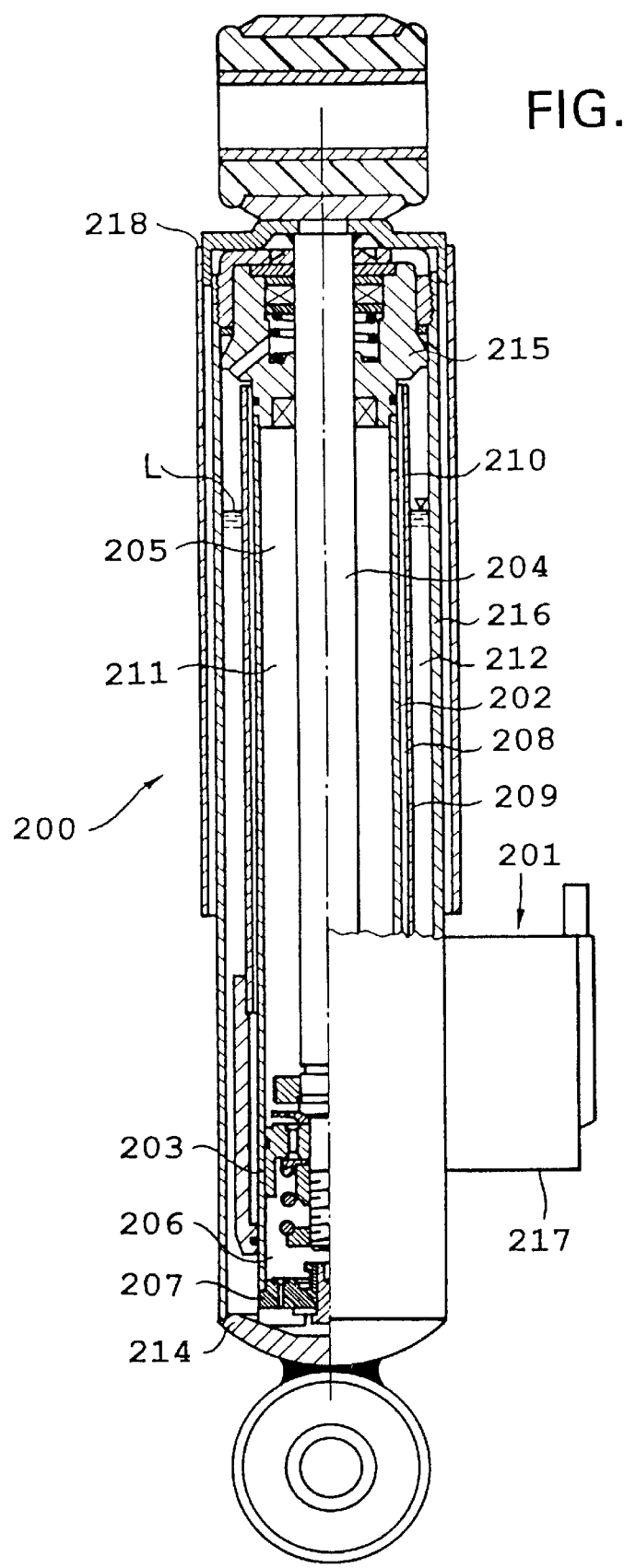
FIG. 1A shows a vibration damper.
Figure 1B:
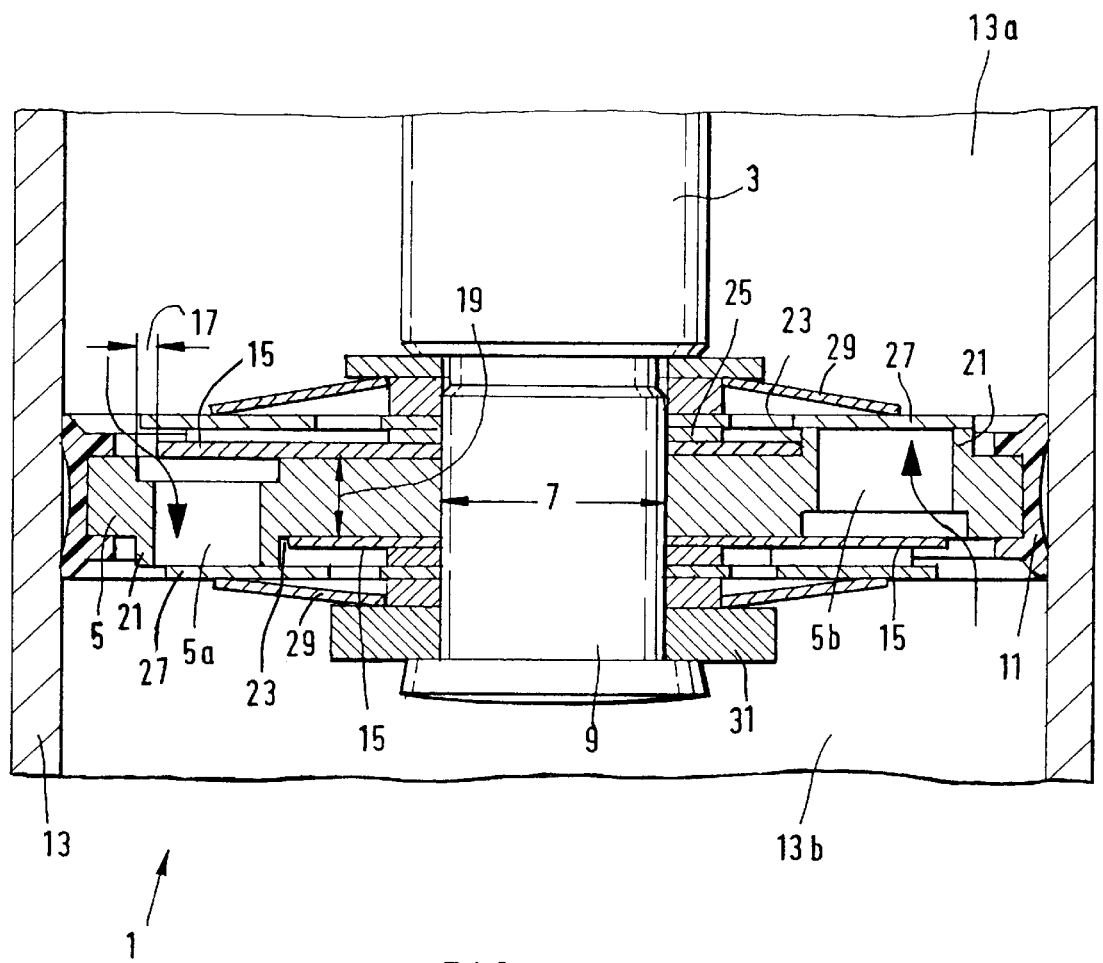

FIGS. 1 and 1B show a vibration damping valve 1 attached to a piston rod 3. The vibration damping valve 1 is installed in a piston 5, which centers itself on a piston rod stud 9 by means of a central bore 7. The damping valve 1 is realized as a disk-shaped stamping and is encircled by a piston ring 11. A cylinder tube 13, of which only one section is shown, is divided by a damping valve 1 into two work chambers 13a and 13b. Valve disks separate fluid passages 5a and 5b, which permit damping medium to flow from one work chamber to the other as a function of the stroke of the piston rod 3, whereby a damping force is effective.

Figure 2:
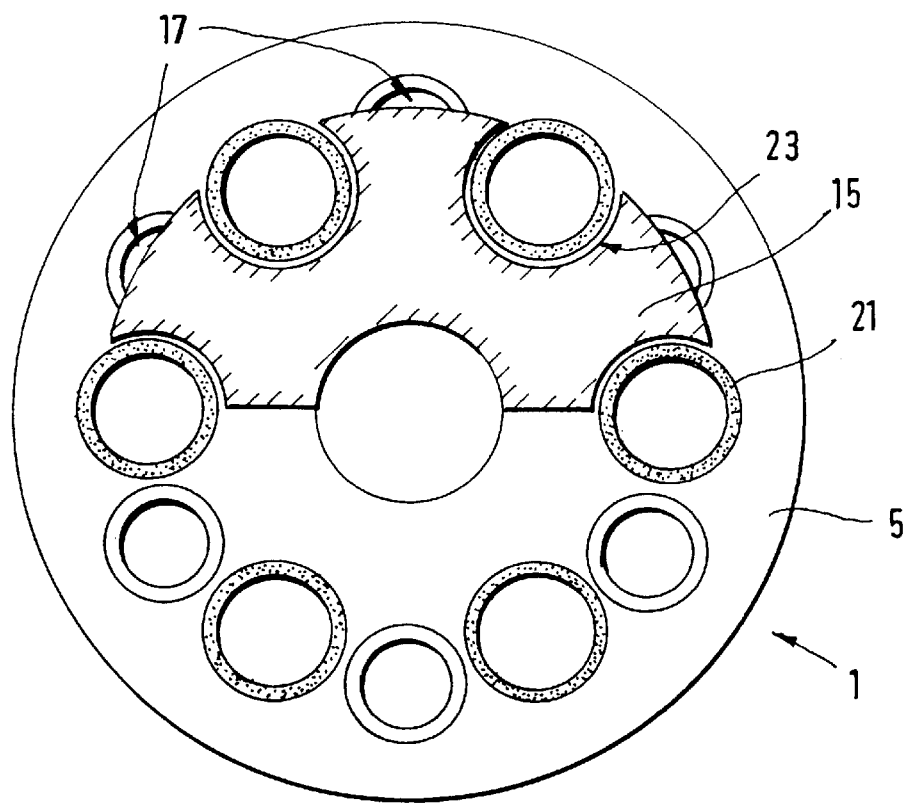
FIGS. 2 and 3 each show views of the damping valve with and without a restrictor plate.
Figure 3:
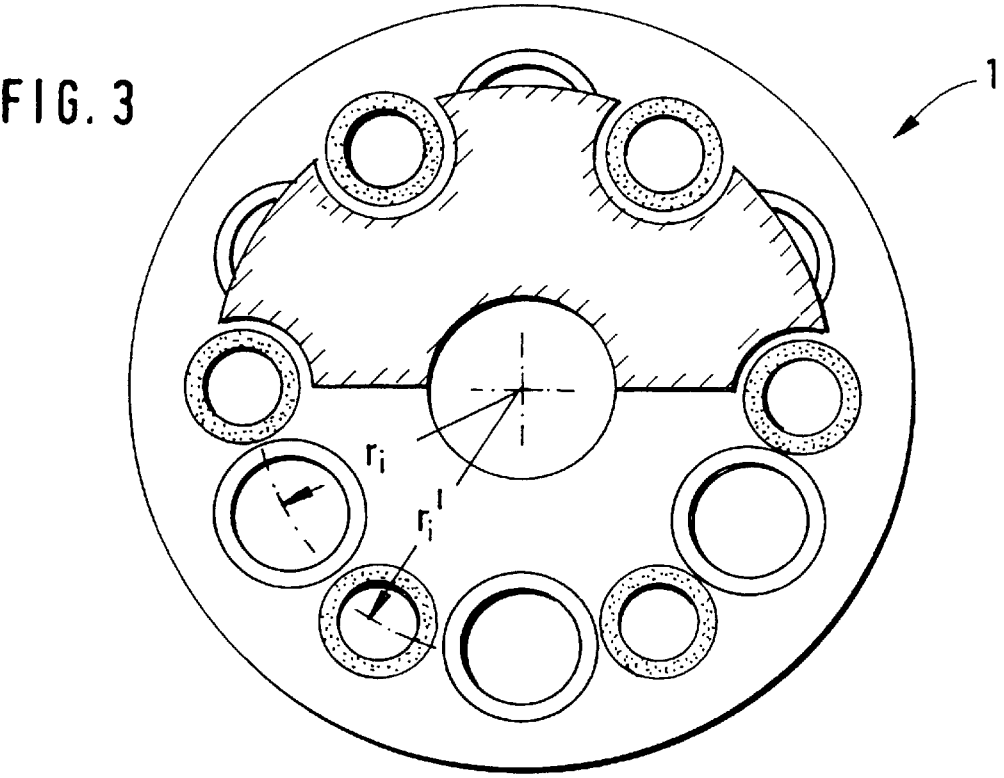

The fluid passages 5a and 5b are partially covered on the inlet side by a restrictor plate or orifice meter 15, creating crescent-shaped admission cross-sections 17 (see FIGS. 2 and 3). These crescent-shaped admission cross-sections 17 represent constant throttles which permit a progressive increase of damping force above a certain flow velocity. That is, above a certain threshold fluid flow velocity, the damping force resulting from fluid flow through the crescent-shaped admission cross-sections 17 increases as fluid flow velocity increases. Projecting portions, embossed areas, or raised areas 21 on the damping valve body are impressed into a main damping valve body 19, whereby the displaced volume on the inlet side corresponds to the volume of the embossed areas 21 on the damping valve body 19. That is, the embossed or raised areas 21 surround an opening of the fluid passages 5a and 5b. The embossed areas 21 are typically produced by a stamping operation, so that the volume of the material of each embossed area 21 is the same as the volume of the recess formed on the opening at the opposite end of the fluid passage 5a and 5b. In essence the stamping operation displaces a volume of material around one opening of the fluid passages 5a and 5b to form a recess, and essentially the same volume of material is displaced at the other opening of the fluid passages 5a and 5b to form an embossed area 21. The restrictor plate 15 has openings, cut away portions, cutouts, or recesses 23 (also see FIGS. 2 and 3), so that the restrictor plate 15 can be attached directly to the main damping valve body 19. That is, the recesses 23 are configured to fit around the embossed areas 21, so that the restrictor plate 15 can be placed directly against the damping valve body 19. In placing the restrictor plate 15 against the damping valve body 19, the restrictor plate 15 forms the crescent-shaped cross-sections 17 at the opening of a fluid passage 5a and 5b without an embossed area. The advantage is that the overall height of the damping valve 1 can be reduced. In addition, the restrictor plate 15 can be connected directly to the damping valve body, to help facilitate assembly. To compensate for the differences in height, a compensating disk or spacer 25, is placed on the restrictor plate 15. A valve disk 27 is mounted on the compensating disk 25. A Belleville spring 29 pretensions the valve disk 27 against the embossed areas 21 on the damping valve body 19. A clamping ring 31, which also centers the Belleville spring 29, fastens the entire damping valve to the piston rod stud 9; the structural height of the damping valve 1 is just as low as that of the known damping valves discussed herein above.

As shown in FIGS. 2 and 3, the fluid passages 5a and 5b are realized on different geometric radii $r_i$, $r_i'$. The restrictor plates 15, which are identical for both directions of flow, create crescent-shaped, unidirectional throttle cross-sections 17 for the intake and pressure directions. The drawings also clearly show that the recesses 23 are essentially identical. The embossed areas on the damping valve center the restrictor plate, in particular in the circumferential direction.

FIGS. 2 and 3 show the restrictor plates 15 with half of the restrictor plate 15 missing. Thus, the half of the restrictor plate 15 shown in FIGS. 2 and 3 shows how the restrictor plate partially covers the fluid passages to produce crescent-shaped cross-sections 17 and shows how the recesses 23 both surround the embossed areas 21 and permit the embossed areas 21 to pass through the restriction plate 15. The missing half of the restrictor plate 15 allows the fluid passages to be shown in their entirety without being partially hidden by the restriction plate 15.

Although the description was in reference to a piston valve as illustrated, the invention is also applicable to a foot valve.

It will be understood that components discussed herebelow with relation to FIG. 1A may, if appropriate, be considered to be interchangeable with components discussed hereinabove with relation to FIGS. 1B, 1, 2, and 3.

FIG. 1A shows a complete vibration damper or oscillation damper 200, a detailed illustration of the valve unit 201 being omitted for the sake of clarity. The valve unit 201 can preferably be enclosed within a side tube 217, which side tube 217 can be welded to a container tube 216. The oscillation damper 200 essentially includes a pressure pipe 202 in which a piston 203 on a piston rod 204 divides a working space 205 into an upper or piston-rod-side working chamber 211 and a lower working chamber 206. A bottom valve unit or foot valve 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding-and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

A cap for the vibration damper is indicated at 218.

The vibration damping valve 1 shown in FIGS. 1B and 1 could be used in vibration damper 200 in place of piston 203 and/or in place of bottom valve unit or foot valve 207.

One feature of the invention resides broadly in the vibration damper whose cylinder tube is divided into two work chambers by a piston attached to a piston rod, whereby a damping valve includes a damping valve body, into the main body of which damping valve embossed areas have been formed which serve as valve support surfaces with fluid passages, which fluid passages are covered by valve disks on the valve support surfaces, and whereby the damping valve body is disk-shaped, characterized by the fact that the damping valve 1 is equipped with at least one restrictor plate or orifice meter 15, which partially covers the fluid passages for at least one direction of flow, whereby the restrictor plate has recesses 23 for the embossed areas 21 on the damping valve body.

Another feature of the invention resides broadly in the vibration damper characterized by the fact that the restrictor plate 15 is fastened directly to the main damping valve body 19.

Yet another feature of the invention resides broadly in the vibration damper characterized by the fact that for each direction of flow there are several fluid passages 5a; 5b having different geometric radii ($r_i$, $r_i'$), whereby the restrictor plates 15 are identical with respect to the recesses 23 if used on both sides of the damping valve.

Still another feature of the invention resides broadly in the vibration damper characterized by the fact that the recesses 23 are matched with respect to shape to the embossed areas 21 on the damping valve body so that the embossed areas on the damping valve body center the restrictor plate.

A further feature of the invention resides broadly in the vibration damper characterized by the fact that the outer contours of the embossed areas of the damping valve body are identical.

Examples of vibration dampers having base valves or foot valves which could possibly be used in conjunction with the present invention can be found in the following U.S. Pat. Nos.: 4,203,507; 4,428,464; 4,561,524; 4,633,983; 4,638,896; 4,650,043; and 4,651,977.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper comprising:
   a cylinder tube;
   an arrangement for connecting said cylinder tube to a first portion of a vehicle;
   a piston being disposed in said cylinder tube to divide said cylinder tube into a first work chamber and a second work chamber tube;
   a piston rod being connected to said piston;
   said piston rod being disposed to project out of said cylinder;
   an arrangement for connecting said piston rod to a second portion of a vehicle; and
   a damping valve;
   said damping valve comprising:
      a damping valve body comprising a first side and a second side;
      a plurality of damping fluid passages being disposed to permit damping fluid to flow through said damping valve body;
      at least two of said damping fluid passages comprising a first end opening disposed on said first side of said damping valve body and a second end opening disposed on said second side of said damping valve body;
      at least a first one of said first end openings comprising a projecting portion projecting beyond a substantial portion of said first side of said valve damping body;
      a restrictor plate disposed adjacent at least a second one of said first end openings to restrict damping fluid flow through at least one of said damping fluid passages corresponding to said at least a second one of said first end openings;
      said restrictor plate comprising at least one cut away portion; and
      said at least one cut away portion being configured to permit said projecting portion to extend at least partially through and at least partially within said at least one cut away portion.

2. The vibration damper according to claim 1 wherein said projecting portion extends at least partially through and at least partially within said at least one cut away portion to minimize rotation of said restrictor plate.

3. The vibration damper according to claim 2 wherein said at least one cut away portion of said restrictor plate is configured to hold said projecting portion to center said restrictor plate with respect to said damping valve body.

4. The damping valve of claim 3, wherein:

said restrictor plate is disposed directly adjacent to said damping valve body; and said restrictor plate is connected directly to said damping valve body.

5. The damping valve of claim 3, wherein:

said damping valve body has a central axis extending between said first side and said second side of said damping valve body;

said plurality of damping fluid passages comprises at least one first passage configured to permit fluid flow from said first side of said damping valve body to said second side of said damping valve body;

said plurality of damping fluid passages comprises at least one second passage configured to permit fluid flow from said second side of said damping valve body to said first side of said damping valve body;

said at least one first passage is disposed a first distance from the central axis;

said at least one second passage is disposed a second distance from the central axis;

the first distance is different from the second distance;

said restrictor plate is a first restrictor plate;

said damping valve comprises a second restrictor plate disposed adjacent at least one of said second end openings to restrict damping fluid flow through at least one damping fluid passage corresponding to said at least one of said second end openings; and said second restrictor plate comprises at least one opening configured substantially identically to said opening of said first restrictor plate.

6. The damping valve of claim 3, wherein:

said at least a first one of said first end openings comprising a projecting portion comprises a plurality of said first end openings each comprising a projecting portion;

said at least one cut away portion of said restrictor plate comprises a plurality of cut away portions configured to permit said projecting portions to extend at least partially within said plurality of cut away portions; and said plurality of cut away portions are configured so that said projecting portions center said restrictor plate on said damping valve body.

7. The damping valve of claim 3, wherein:

said at least a first one of said first end openings comprising a projecting portion comprises a plurality of said first end openings each comprising a projecting portion;

each of said projecting portions has an outer contour disposed away from a corresponding one of said fluid passages; and each of said outer contours is substantially identical to one another.

8. The damping valve of claim 3, wherein:

said damping valve comprises a valve disk;

said valve disk is disposed to cover and be supported by said projecting portion;

said restrictor plate is disposed adjacent to said damping valve body; and said restrictor plate is disposed between said damping valve body and said valve disk.

9. The damping valve of claim 8, wherein:

said at least one of said first end openings comprising a projecting portion comprises a plurality of said first end openings each comprising a projecting portion;

said at least one cut away portion of said restrictor plate comprises a plurality of cut away portions configured to permit said projecting portions to extend at least partially within said plurality of cut away portions; and said valve disk disposed to cover and be supported by said projecting portion is disposed to cover and be supported by said projecting portions.

10. The damping valve of claim 9, wherein:

said projecting portions comprise embossed areas;

said damping valve body has a central axis extending between said first side and said second side of said damping valve body;

said plurality of damping fluid passages comprises at least one first passage configured to permit fluid flow from said first side of said damping valve body to said second side of said damping valve body;

said plurality of damping fluid passages comprises at least one second passage configured to permit fluid flow from said second side of said damping valve body to said first side of said damping valve body;

said at least one first passage is disposed a first distance from the central axis;

said at least one second passage is disposed a second distance from the central axis;

the first distance is different from the second distance;

said plurality of cut away portions are configured so that said embossed areas center said restrictor plate on said damping valve body;

said damping valve body is configured to be disk-shaped; and said damping valve body and said piston form a solitary unit.

11. A damping valve for a vibration damper, said damping valve comprising:

a damping valve body comprising a first side and a second side;

a plurality of damping fluid passages being disposed to permit damping fluid to flow through said damping valve body;

at least two of said damping fluid passages comprising a first end opening disposed on said first side of said damping valve body and a second end opening disposed on said second side of said damping valve body;

at least a first one of said first end openings comprising a projecting portion projecting beyond a substantial portion of said first side of said valve damping body;

a restrictor plate disposed adjacent at least a second one of said first end openings to restrict damping fluid flow through at least one of said damping fluid passages corresponding to said at least a second one of said first end openings;

said restrictor plate comprising at least one cut away portion; and said at least one cut away portion being configured to permit said projecting portion to extend at least partially through and at least partially within said at least one cut away portion.

12. The damping valve according to claim 11 wherein said at least one cut away portion of said restrictor plate is configured to hold said projecting portion to center said restrictor plate with respect to said damping valve body.

13. The damping valve according to claim 12 wherein said projecting portion extends at least partially through and at least partially within said at least one cut away portion to minimize rotation of said restrictor plate.

14. The vibration damper of claim 13, wherein:

said restrictor plate is disposed directly adjacent to said damping valve body; and said restrictor plate is connected directly to said damping valve body.

15. The vibration damper of claim 13, wherein:

said damping valve body has a central axis extending between said first side and said second side of said damping valve body;

said plurality of damping fluid passages comprises at least one first passage configured to permit fluid flow from said first side of said damping valve body to said second side of said damping valve body;

said plurality of damping fluid passages comprises at least one second passage configured to permit fluid flow from said second side of said damping valve body to said first side of said damping valve body;

said at least one first passage is disposed a first distance from the central axis;

said at least one second passage is disposed a second distance from the central axis;

the first distance is different from the second distance;

said restrictor plate is a first restrictor plate;

said damping valve comprises a second restrictor plate disposed adjacent at least one of said second end openings to restrict damping fluid flow through at least one damping fluid passage corresponding to said at least one of said second end openings; and said second restrictor plate comprises at least one opening configured substantially identically to said opening of said first restrictor plate.

16. The vibration damper of claim 13, wherein:

said at least a first one of said first end openings comprising a projecting portion comprises a plurality of said first end openings each comprising a projecting portion;

said at least one cut away portion of said restrictor plate comprises a plurality of cut away portions configured to permit said projecting portions to extend at least partially within said plurality of cut away portions; and said plurality of cut away portions are configured so that said projecting portions center said restrictor plate on said damping valve body.

17. The vibration damper of claim 13, wherein:

said at least a first one of said first end openings comprising a projecting portion comprises a plurality of said first end openings each comprising a projecting portion;

each of said projecting portions has an outer contour disposed away from a corresponding one of said fluid passages; and each of said outer contours is substantially identical to one another.

18. The vibration damper of claim 13, wherein:

said damping valve comprises a valve disk;

said valve disk is disposed to cover and be supported by said projecting portion;

said restrictor plate is disposed adjacent to said damping valve body; and said restrictor plate is disposed between said damping valve body and said valve disk.

19. The vibration damper of claim 18, wherein:

said at least one of said first end openings comprising a projecting portion comprises a plurality of said first end openings each comprising a projecting portion;

said at least one cut away portion of said restrictor plate comprises a plurality of cut away portions configured to permit said projecting portions to extend at least partially within said plurality of cut away portions; and said valve disk disposed to cover and be supported by said projecting portion is disposed to cover and be supported by said projecting portions.

20. The vibration damper of claim 19, wherein:

said projecting portions comprise embossed areas;

said damping valve body has a central axis extending between said first side and said second side of said damping valve body;

said plurality of damping fluid passages comprises at least one first passage configured to permit fluid flow from said first side of said damping valve body to said second side of said damping valve body;

said plurality of damping fluid passages comprises at least one second passage configured to permit fluid flow from said second side of said damping valve body to said first side of said damping valve body;

said at least one first passage is disposed a first distance from the central axis;

said at least one second passage is disposed a second distance from the central axis;

the first distance is different from the second distance;

said plurality of cut away portions are configured so that said embossed areas center said restrictor plate on said damping valve body;

said damping valve body is configured to be disk-shaped; and said damping valve body and said piston form a solitary unit.

* * * * *